United States Patent [19]

Greuel

[11] Patent Number: 5,040,093
[45] Date of Patent: Aug. 13, 1991

[54] CAPACITOR AND METHOD OF MANUFACTURING SAME

[75] Inventor: Georg Greuel, Simmerath, Fed. Rep. of Germany

[73] Assignee: U.S. Philips Corp., New York, N.Y.

[21] Appl. No.: 487,565

[22] Filed: Mar. 2, 1990

[30] Foreign Application Priority Data

Mar. 3, 1989 [DE] Fed. Rep. of Germany ....... 3906731

[51] Int. Cl.$^5$ .................... H01G 4/10; H01G 7/00
[52] U.S. Cl. .................................. 361/321; 29/25.42
[58] Field of Search .............. 361/320, 321, 303, 304, 361/305, 306; 29/25.42

[56] References Cited

U.S. PATENT DOCUMENTS

| | | | |
|---|---|---|---|
| 3,896,354 | 7/1975 | Coleman et al. | 361/321 |
| 4,433,359 | 2/1984 | Hamabe | 361/273 |
| 4,729,058 | 3/1988 | Gupta et al. | 361/321 |
| 4,924,064 | 5/1990 | Stormbom et al. | 361/305 X |

FOREIGN PATENT DOCUMENTS

| | | |
|---|---|---|
| 1161479 | 9/1958 | France . |
| 1324010 | 7/1973 | United Kingdom . |
| 2032689 | 5/1980 | United Kingdom ................ 361/303 |

Primary Examiner—Donald A. Griffin
Attorney, Agent, or Firm—William L. Botjer

[57] ABSTRACT

A capacitor having at least one dielectric layer present between each time a flat electrode and an opposite electrode, in which the electrode(s) and the opposite electrode(s) are staggered with respect to each other so that in the plane of each time one of two opposing end faces of the capacitor they terminate in the same plane and are contacted there by means of external connection contacts, in which at least one electrode in its end area adjacent the external connection contact associated with it comprises a window and that the non-contacted end(s) of the opposite electrode(s) extend(s) in the area of the window(s).

6 Claims, 2 Drawing Sheets

CAPACITOR AND METHOD OF MANUFACTURING SAME

BACKGROUND OF THE INVENTION

The invention relates to a capacitor having at least one dielectric layer present between a flat electrode and an opposite flat electrode, in which the electrode(s) and the opposite electrode(s) are staggered with respect to each other in such a manner that in the plane of each time one of two oppositely located end faces of the capacitor they terminate and are contacted there by means of external connection contacts.

Capacitors, for example, ceramic multilayer capacitors, are produced in large numbers since, on the basis of their properties, they are particularly suitable for automatic printed circuit board mounting (SMD technology with surface mounted devices). Multilayer capacitors have a high volume capacity, i.e. they are not very bulky, they have the advantage of a large range of the capacity from pF to $\mu$F and they can be manufactured in standardized dimensions.

In order to ensure the cost reduction and quality improvement which can be achieved by means of SMD techniques, high requirements are imposed upon all components used as regards rejection rate and units of the permissible capacity tolerances.

Ceramic multilayer capacitors are manufactured in known manner in that a foil is rolled or drawn from a suspension of a dielectric ceramic powder with a binder. The said foil is cut into individual plates, on which electrodes are provided by means of a metal paste in a silk screening method.

The printed green ceramic foils are stacked and packed under a high pressure. From the said sandwich pack individual capacitor bodies in the form of a sandwich stack are punched or cut before the binder is cured and the sandwich stack is sintered. According to this sintering process the contacting of the electrode layers is done by metallizing the opposing end faces of the capacitor body.

Associated with this method of manufacturing is that inhomogeneous starting materials or variable process parameters, such as time, temperature, composition of the sintering atmosphere or tolerances within the automatic production machines, for example, upon aligning tool and workpiece, lead to a deviation of the capacity from the desired value. By optimizing the manufacturing process, these error sources can be removed only partly not in the least because the price calculated on the market per component is limited and a large series manufacture may not be arbitrarily expensive.

Known multilayer capacitors are constructed as is shown in FIG. 3. Reference numeral 2 denotes the electrodes, 4 denotes the opposite electrodes, 6 are the outer connection contacts at the end faces of the capacitor and 8 denotes the dielectric layers. When the individual electrodes move with respect to each other in the x and in the y direction, as is shown in FIG. 4, the surface covered in common with the opposite electrodes following in the sandwich stack also vary so that according to the known laws of physics a capacity change occurs. This problem is not restricted to multilayer capacitors, but generally extends to flat capacitors having electric connections (external connection contacts) provided from oppositely located end faces, so, for example, plate capacitors.

According to the prior art the expert is capable of considerably compensating for shifts of the electrodes 2 in the y direction as shown in FIG. 4, in that each opposite electrode 4 is widened within the sandwich stack. FIG. 5 is a sectional view in the y direction through a sandwich stack having two electrodes 2 which are widened (FIG. 5a). The capacity of a multilayer capacitor constructed in such a manner varies only slightly so long as the opposite electrode 4, in spite of a movement about the length $\Delta y$, fully remains within the common overlapping area of its adjacent electrodes 2 (FIG. 5b). However, it is particularly desirable to also compensate for a lateral staggering of individual electrodes 2 in the x direction as is shown in FIG. 4, since the said lateral staggering in the x direction very essentially influences the values for the capacity.

SUMMARY OF THE INVENTION

It is the object of the invention to improve the quality of capacitors and in particular to show a way how undesired capacity changes as a result of an electrode shift in the direction towards the external connection contacts, so in the x direction, which shift can be avoided only with difficulty in the manufacture of such capacitors, can be substantially avoided.

According to the invention this object is achieved in that at least one electrode in its end area adjacent the external connection contact associated with it comprises a window and that the non-contacted end(s) of the opposite electrode(s) extend(s) in the area of the window(s).

According to an advantageous further embodiment of the capacitor according to the invention at least one opposite electrode comprises a window in its end area adjacent the external connection contact associated with it.

According to advantageous further embodiments of the invention the electrode(s) and/or the opposite electrode(s) in the area of its (their) window(s) comprise a widened area or the window(s) is (are) divided in such a manner that at least one central bridge of electrode material is formed which extends in the longitudinal direction of the electrode(s) and/or the opposite electrode(s).

The dielectric layers preferably consist of ceramics in which the electrodes/opposite electrodes are preferably metal layers, for example, of nickel or chromium/-nickel.

A method of manufacturing capacitors formed according to the invention in which at least one dielectric layer is provided with each time a flat electrode and an opposite flat electrode and the electrode(s) and the opposite electrode(s) are staggered with respect to each other in such a manner that in the plane each time of one of two opposing end faces of the capacitor they terminate in the same plane, after which the external connection contacts contacting the electrode(s)/opposite electrode(s) are provided at the end faces, is characterized in that a window is provided in at least one electrode in its end area adjacent the external connection contact associated with it and that the electrode(s) is (are) provided so that the non-contacted end(s) of the opposite electrode(s) extend(s) in the area of the window(s).

According to an advantageous further embodiment of the method according to the invention the capacitor is constructed from at least one foil of unburnt green ceramic as a dielectric layer having provided thereon metallic layers for the electrode(s) and the opposite electrode(s), is then sintered and provided with the external connection contacts.

According to a further advantageous embodiment of the method according to the invention the layers for the electrode(s) and opposite electrode(s) are provided on the dielectric layer(s) in the form of a suspension of metal powder in an organic binder while using at least one mask which covers the areas of the dielectric layer(s) not to be coated with the suspension and in particular the areas corresponding to the windows to be formed.

The invention provides the particular advantage that the capacity of capacitors of the above-described type remains considerably uninfluenced also when individual electrodes or opposite electrodes move undesirably with respect to each other in the direction of the external connection contacts, so in the x direction, with respect to the opposite electrodes adjacent same.

BRIEF DESCRIPTION OF THE DRAWINGS

Embodiments of the invention will now be described in greater detail hereinafter with reference to a multilayer capacitor.

In the drawing

DETAILED DESCRIPTION OF THE PREFERRED EMBODIMENT

The present invention suggests forms of electrodes and opposite electrodes, for example, for multilayer capacitors which make the capacity substantially independent of a shift of the electrodes and/or the opposite electrodes in the direction of the two external contacts contacting the electrodes and opposite electrodes. The principle solution of this problem is shown in FIGS. 1a to 2b.

Figure 1A:
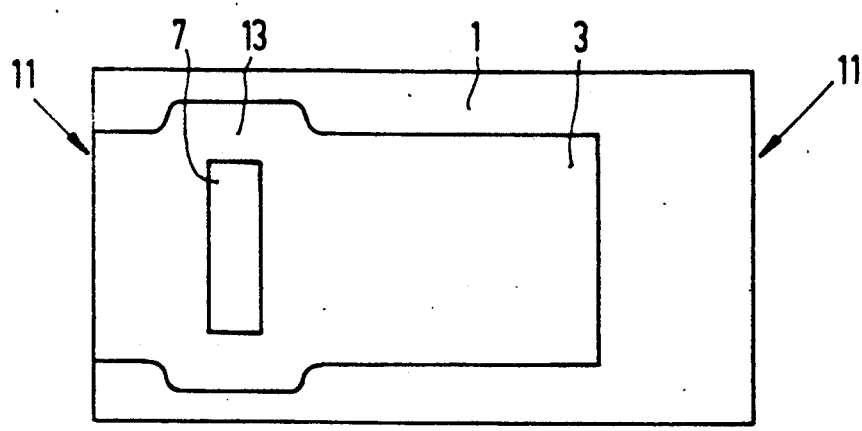
FIGS. 1a, 1b are a plan view (FIG. 1a) and a sectional view (FIG. 1b) of a principle arrangement of an electrode formed according to the invention.
Figure 1B:
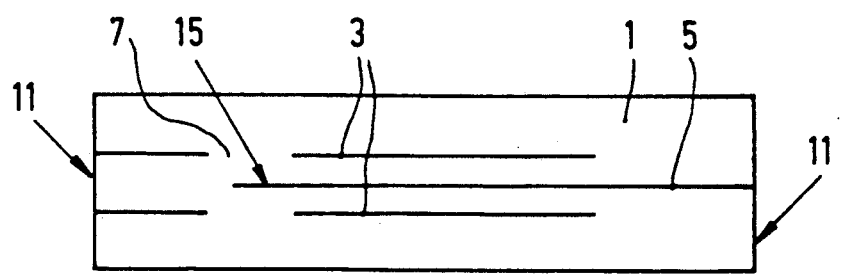

According to the embodiment shown in principle in FIG. 1 of an electrode 3 on a dielectric layer 1 a window 7 is recessed in the electrode 3 in its area adjacent the external connection contact 11. The electrode 3 has a widened surface 13 in its area adjoining the window 7. FIG. 1b is a sectional view of this embodiment. In the embodiment shown a window 7 is provided in each electrode 3 in the sandwich stack (compare FIG. 1), so that the non-contacted end 15 of the opposite electrode 5 following next in the sandwich stack lies in the area of the window 7. So long as this condition is fulfilled the capacity of such a multilayer capacitor changes only very inconsiderably as compared with multilayer capacitors having electrodes which do not comprise (a) window(s) when a shift of the electrodes 3 and/or opposite electrodes 5 in the direction of the outer connection contacts 11 (so in the x direction), occurs. The stability of the capacity values significantly improved in this manner is maintained so long as the surface covered in common by the electrodes 3 and opposite electrodes 5 remains unchanged.

As a result of the formation of windows, however, the charge transport is inhibited and moreover the danger exists that an electrode or opposite electrode is detached from the external connection contact 11 because one or both bridges 17 (compare FIG. 2) of remained electrode material are interrupted above or below the window 7. Therefore, the expert must choose the dimensions of the window 7 with respect to the remaining electrode material surrounding same in such a manner that the two said disadvantages are in a sensible relationship with the advantage of the stabilization of the capacity value achievable by a window in the electrode/opposite electrode.

Figure 5A:
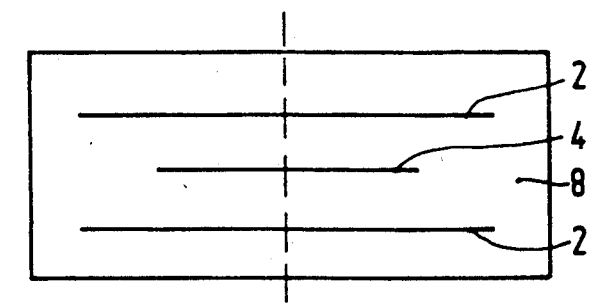
Figure 5B:
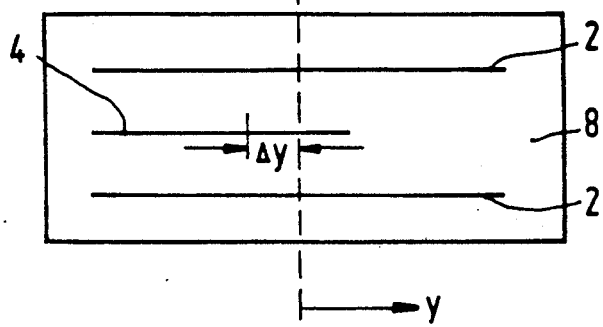

When using electrodes which are wider as compared with the opposite electrodes for compensating lateral shifts of the electrodes in the direction of the outer surfaces of the sandwich stack not provided with external connection contacts, so a shift in the y direction (compare FIG. 5b), it is sensible to provide the wider electrodes with a window because more area remains there after the formation of the window than when the window is provided in the narrower opposite electrodes.

The following embodiments of the electrodes/opposite electrodes according to the invention are advantageous:

As is shown in FIG. 1a the electrodes 3 and/or the opposite electrodes 5 may comprise a widened area 13 in the area of the windows 7. As a result of this it is ensured that a sufficient contacting with the external connection contacts 11 is formed because the bridges of electrode material formed as a result of this above and below the windows 7 may be comparatively wide.

Figure 2A:
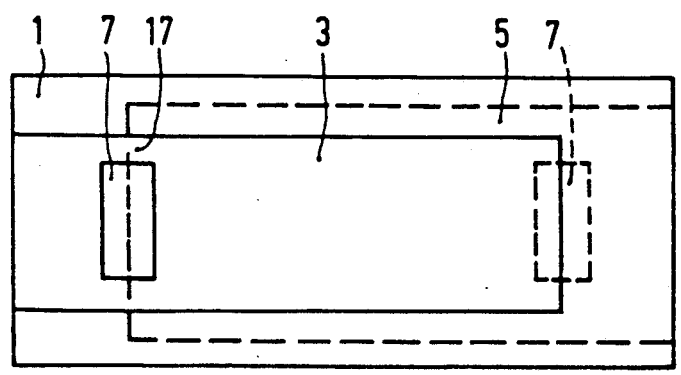
FIGS. 2a and 2b are plan views on multilayer capacitors with different embodiments of electrodes/opposite electrodes formed according to the invention.

As is shown in FIG. 2a both the electrodes 3 and the opposite electrodes 5 may be provided with windows 7. This provides two advantages: in order to compensate for a given shift $\Delta x$ in the x direction with respect to the capacity values, small window widths in the x direction suffice as compared with the embodiment having only windows in each electrode 3 or opposite electrode 5. This reduces the danger that the electrodes 3 or opposite electrodes 5, as a result of interrupted bridges 17, have no sufficient contact with the external connection contact 11 contacting same. On the other hand in the case of wider window dimensions in the x direction which correspond to the widths of windows which are each provided only in the electrodes 3 or only in the opposite electrodes 5, a larger shift $\Delta x$ can be compensated for.

Figure 2B:
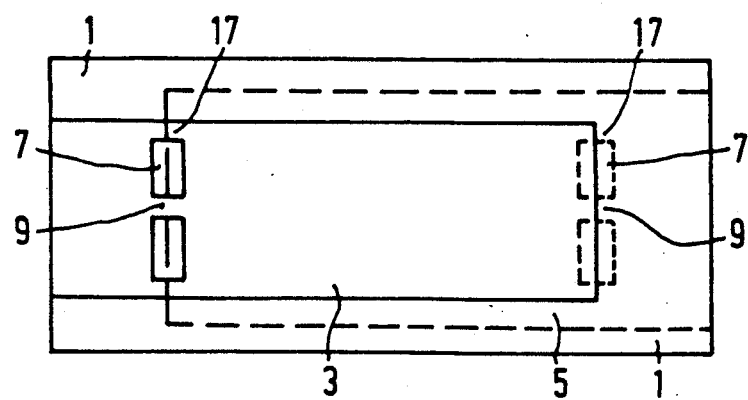
Figure 3:
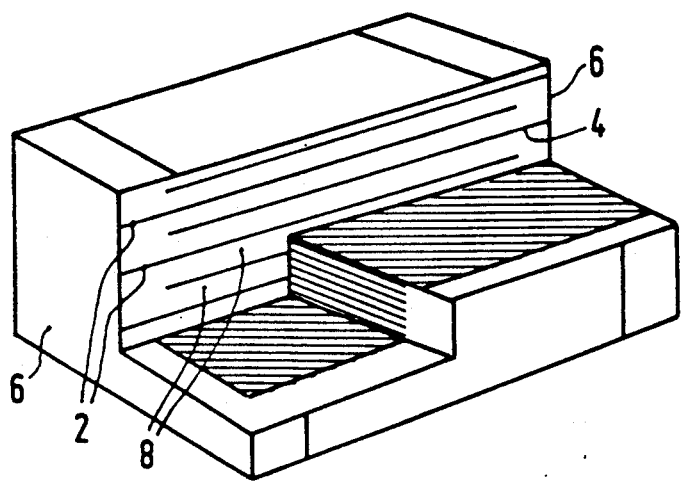
Figure 4:
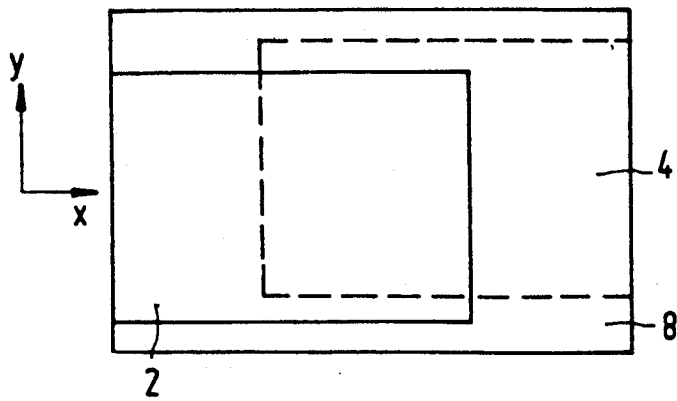

As is shown in FIG. 2b, the windows 5 may also be severed so that a central bridge 9 of electrode material extending in the longitudinal direction of the electrodes 3 or also of the opposite electrodes 5 is obtained. As a result of this the danger of an unsatisfactory contact with the external connection contacts 11 is also effectively reduced.

The electrodes or opposite electrodes for multilayer capacitors formed according to the invention occupy a part of the electrical field between the electrodes/opposite electrodes through the windows which, however, provide the advantage of a stabilization of the capacity value. As a result of this the volume capacity of multilayer capacitors formed according to the invention reduces inconsiderably as compared with known multilayer capacitors of the same dimensions but with electrodes and opposite electrodes without windows. In order to achieve the same volume capacity values with multilayer capacitors formed according to the invention as with known multilayer capacitors of the same construction, the sandwich stack can be expanded, if so desired, by one electrode/dielectric layer.

The effectivity of the measures suggested according to the invention will be described in greater detail with reference to a numerical example.

The following capacity calculation is based on the known formula for the plate capacitor $$C = \epsilon \times \frac{A}{d}$$

$\epsilon = \epsilon_0 \epsilon_r$ dielectric constant,
A = area covered by both plates in common,
d = plate spacing.

In this calculation only the field between the plates and within the area covered in common is taken into account. The inclusion of edge effects would influence all the calculated results in the same manner (inconsiderably), the qualitative expression is not varied by it.

Multilayer capacitors having a sandwich stack of five electrodes I to V and inbetween arranged dielectric layers of a relative dielectric constant of $\epsilon_r = 133$ and a spacing of d = 20 μm between adjacent electrodes/opposite electrodes, will be considered hereinafter. These and all remaining values are oriented to the real order of magnitude of typical multilayer capacitors. All results are rounded down to one decimal behind the decimal point.

1. Multilayer capacitor having equally formed electrodes without window: the electrodes I, III and V are considered to be contacted with the first external connection contact and the electrodes II and IV are considered to be contacted with the second external connection contact.

With an overlap area between adjacent electrodes/opposite electrodes of A = 2 mm × 1 mm it follows that $$C = 4 \times \epsilon \times \frac{A}{d}$$
$$= 4 \times 8.85 \times 10^{-12} \frac{F}{m} \times 133 \times \frac{2 \text{ mm}^2}{20 \text{ μm}}$$
$$= 470.8 \text{ pF}.$$

When one of the electrodes 2, 3 or 4 is moved in the x direction and in the y direction so that an average overlap area of A = 1.75 × 0.09 between adjacent electrodes/opposite electrodes is obtained, it follows that $$\bar{C} = 2 \times \epsilon \times \frac{A + \bar{A}}{d}$$
$$= 2 \times 8.85 \times 10^{-12} \frac{F}{m} \times 133 \times \frac{2 \text{ mm}^2 + 1.575 \text{ mm}^2}{20 \text{ μm}}$$
$$= 420.8 \text{ pF}.$$

The capacity variation hence amounts to 10.6%. When one of the electrodes I or V is shifted a capacity variation of 5.3% is obtained in a corresponding manner.

2. A multilayer capacitor with unequally formed electrodes, i.e. provided with windows and widened electrodes: the electrodes I, III and V are considered again to be contacted with the first external connection contact and provided with windows in the area of their end area adjacent the external connection contacts, into which windows the adjacent opposite electrodes II and IV extend up to approximately the centre of the window with their end faces not contacted with the second external connection contact. The electrodes I, III and V are additionally considered to be widened with respect to the opposite electrodes II and IV.

With A = 2 mm × 1 mm as an overlap area between adjacent electrodes/opposite electrodes the same capacity as according to example 1 is obtained for $$C = 4 \times \epsilon \times \frac{A}{d}$$
$$= 470.8 \text{ pF}.$$

When one of the electrodes I, III or V or one of the opposite electrodes II or IV is moved in the x and/or in the y direction over a length Δx lying within the window area or by a length Δy lying in the range of the widths of the electrodes I, III and V larger as compared with the widths of the electrodes II and IV, the overlap area between adjacent electrodes does not vary and the capacity value remains constant.

I claim:

1. A capacitor having at least one dielectric layer present between a flat electrode and an opposite flat electrode, in which the electrode(s) and the opposite electrode(s) are staggered with respect to each other so that one of two opposing end faces of the capacitor is terminated and contacted by means of external connection contacts, characterized in that both the flat electrode and the opposite flat electrode at their end areas adjacent the external connection contact comprise a window and that the non-contacted end(s) of the electrode(s) extend(s) in the area of the window(s).

2. A capacitor as claimed in claim 1, characterized in that the electrode(s) (3) and/or the opposite electrode(s) (5) comprises a widened area (13) in the area of its (their) window(s) (7).

3. A capacitor as claimed in at least claim 1, characterized in that the window(s) (7) is (are) each time severed in such a manner that at least one central bridge of electrode material is formed in the longitudinal direction of the electrode(s) (3) and/or of the opposite electrode(s) (5).

4. A capacitor as claimed in claim 1, characterized by at least one dielectric layer (1) of ceramics.

5. A capacitor as claimed in claim 1, characterized by each time at least one electrode (3) and opposite electrode (5) in the form of metal layers.

6. A capacitor as claimed in claim 5, characterized by each time at least one electrode (3) and opposite electrode (5) of layers of nickel or chromium/nickel.

* * * * *